(12) United States Patent
Adda

(10) Patent No.: US 12,047,364 B2
(45) Date of Patent: Jul. 23, 2024

(54) METHOD FOR CONNECTING A COMPUTER APPLICATION TO A SECURE COMPUTER RESOURCE

(71) Applicant: WALLIX, Saint-Honoré (FR)

(72) Inventor: Serge Adda, Antony (FR)

(73) Assignee: WALLIX, Saint-Honoré (FR)

( * ) Notice: Subject to any disclaimer, the term of this patent is extended or adjusted under 35 U.S.C. 154(b) by 267 days.

(21) Appl. No.: 17/418,717

(22) PCT Filed: Dec. 26, 2019

(86) PCT No.: PCT/FR2019/053299
§ 371 (c)(1),
(2) Date: Jun. 25, 2021

(87) PCT Pub. No.: WO2020/141277
PCT Pub. Date: Jul. 9, 2020

(65) Prior Publication Data
US 2022/0078176 A1    Mar. 10, 2022

(30) Foreign Application Priority Data

Jan. 4, 2019 (FR) .................................... 1900092

(51) Int. Cl.
*H04L 9/40* (2022.01)
*H04L 9/08* (2006.01)
*H04L 67/141* (2022.01)

(52) U.S. Cl.
CPC ............ *H04L 63/08* (2013.01); *H04L 9/0872* (2013.01); *H04L 67/141* (2013.01)

(58) Field of Classification Search
CPC ..... H04L 63/08; H04L 9/0872; H04L 67/141; H04L 63/0853; H04L 67/125;
(Continued)

(56) References Cited

U.S. PATENT DOCUMENTS

| 10,049,335 | B1 * | 8/2018 | Narkier | .............. G06Q 10/0637 |
| 2003/0084198 | A1 * | 5/2003 | Mandal | .................... G06F 9/465 719/316 |

(Continued)

FOREIGN PATENT DOCUMENTS

WO    2018/162810 A1    9/2018

OTHER PUBLICATIONS

Anonymous—sshpass(1)—Linux man page, Dec. 21, 2018, Retrieved from the Internet: https ://web .arc hi ve.org/web/20 18122105 2026/https://linux.die.net/man/1/sshpass, Dec. 21, 2018, 3 pages.

(Continued)

*Primary Examiner* — J. Brant Murphy
(74) *Attorney, Agent, or Firm* — TraskBritt

(57) ABSTRACT

A method for connecting an application to a resource by a command, the application being provided for configuring the resource by connecting to the resource by means of a program and configuration parameters, the program implementing a client side of a communication protocol, the method comprising the steps of executing the command when the program is called by the application, the command being interposed between the application and the program; receiving authentication data for accessing the resource, by querying a vault, on the basis of configuration parameters; establishing a connection between the command and the resource by executing the program, into which the authentication data for accessing the resource are input and the configuration parameters retrieved; and establishing a direct connection between the application and the resource.

20 Claims, 3 Drawing Sheets

(58) Field of Classification Search
CPC ....... H04L 9/0866; H04L 9/083; H04L 67/08; H04L 63/0428
See application file for complete search history.

(56) References Cited

U.S. PATENT DOCUMENTS

| | | | | |
|---|---|---|---|---|
| 2003/0172088 | A1* | 9/2003 | Mandal | G06F 16/10 |
| 2004/0181542 | A1* | 9/2004 | Mullins | G06F 9/4493 |
| | | | | 707/999.102 |
| 2006/0195816 | A1* | 8/2006 | Grandcolas | G06Q 40/02 |
| | | | | 717/102 |
| 2007/0011194 | A1* | 1/2007 | Gurevich | G06F 9/543 |
| 2012/0054741 | A1* | 3/2012 | Ali | G06F 9/45545 |
| | | | | 718/1 |
| 2014/0129457 | A1* | 5/2014 | Peeler | G06Q 30/018 |
| | | | | 705/317 |
| 2016/0315970 | A1* | 10/2016 | Sharma | H04L 63/102 |
| 2019/0026716 | A1* | 1/2019 | Anbukkarasu | G06Q 20/308 |
| 2020/0120158 | A1* | 4/2020 | Nelluri | G06Q 10/063 |

OTHER PUBLICATIONS

Anonymous, Rotate Privileged Credentials Using Beyond Trust Vault for Privileged Remote Access, Retrieved from the Internet: https://www.beyondtrust.com/docs/privileged-remote-access!how-to/vaulUrotation.htm, 3 pages.

IBM Security Identity Manager, Version 7.0.1.8, Checking out a Credential or Credential Pool, (Oct. 25, 2012), https://www.ibm.com/support/know ledgecenter/SSRMWJ_7 .0.1.8/com.ibm.isim.doc/scenarios/tsk/tsk_ic_sce.

International Search Report for International Application No. PCT/FR2019/053299, dated Apr. 9, 2020, 3 pages.

International Written Opinion for International Application No. PCT/FR2019/053299, dated Apr. 9, 2020, 18 pages with translation.

* cited by examiner

Fig 6

```
        do {
                nanosleep(&timeout, NULL); // Delay necessary to let the process load all its shared objects.
                NODEBUGGER1(-1);
                n = readlink(data, exe, STR_MAX);
                if (n == -1) {
                        error("cannot get ssh executable\n");
                        return -1;
                }
                exe[n] = '\0';
        } while (strcmp(exe, cmd) != 0);
```

METHOD FOR CONNECTING A COMPUTER APPLICATION TO A SECURE COMPUTER RESOURCE

CROSS-REFERENCE TO RELATED APPLICATIONS

This application is a national phase entry under 35 U.S.C. § 371 of International Patent Application PCT/FR2019/053299, filed Dec. 26, 2019, designating the United States of America and published as International Patent Publication WO 2020/141277 A1 on Jul. 9, 2020, which claims the benefit under Article 8 of the Patent Cooperation Treaty to French Patent Application Serial No. 1900092, filed Jan. 4, 2019.

TECHNICAL FIELD

The present disclosure relates to the field of DevOps, which is a concatenation of the first three letters of the English word development, referring to software development, and the usual abbreviation "ops" of the English word operations, referring to the administration of IT infrastructures and, in particular, system administration.

BACKGROUND

According to the SDN network architecture model, for English software-defined networking, network administrators can manage network services through abstraction of functionalities. This network architecture model comprises a set of technologies having a centralized control of the network resources and a centralized orchestration and a virtualization of the physical resources in common.

With the development of the SDN network architecture model, new IT structures are increasingly managed using concepts from the field of DevOps. DevOps is a movement in computer engineering and a technical practice aimed at the unification of software development (dev) and the administration of computer infrastructures (ops), particularly system administration.

At first, this primarily concerned public clouds, for English public cloud, such as AWS, for Amazon Web Services, which targets on-demand cloud computing services, for English cloud computing, for businesses and individuals, or Azure, which is the application platform developed by Microsoft. However, these concepts are quickly spreading across all types of infrastructure.

One of the main strengths of these technologies is the automation of management tasks. Specific tools have been developed to achieve this, such as Ansible (free software platform for the configuration and management of computers), Puppet (free software allowing management of the configuration of slave servers), or Chief (free configuration management software).

These tools automate the execution of tasks on a set of resources. They do this by relying heavily on protocols such as SSH to connect, deploy, and run scripts on resources. Running these scripts requires access to credentials without human interaction.

This need is already addressed by using the concepts of plug-ins that are configured to extract credentials from a vault. For this purpose, it is useful to refer to the international application, published under the number WO 2018/162810, which proposes a method for accessing a computer resource that is secured by a computer application.

The secure computer resource has no human-machine interaction for entering authentication information. The proposed method comprises a) a first initialization step comprising the creation of a transient cryptographic key consisting in applying cryptographic processing to a plurality of time-invariant information items and in encrypting, using the transient cryptographic key calculated in this manner, authentication data of an account that is authorized to access a password vault and b) steps of automatic access by the application to the secure computing resource, consisting in creating a transient cryptographic key consisting in applying cryptographic processing to the plurality of time-invariant information items, to be read from the credential file, for English credential, that were created during the initialization step, and in decrypting the credential file using the transient cryptographic key that was calculated in the previous step, and then in transferring the data coming from the computer resource to the calling application.

It would be possible to implement the access method according to the prior art in order to provide the password to specific tools that have been developed, such as Ansible. However, the attack surface between the extraction of credentials and use thereof by the underlying access tool (primarily the SSH client) still provides a great opportunity for an attacker to steal the credentials.

BRIEF SUMMARY

One aim of the present disclosure is to remedy all or part of the aforementioned drawbacks.

According to a first aspect of the present disclosure, a method is proposed for connecting a computer application to a secure computer resource by means of a facade command.

The computer application is initially configured to establish a connection to the secure resource using a client program and configuration parameters.

The client program implements a client part of a communication protocol and is configured to receive authentication data as input.

According to one feature, the computer application is of the devops type—that is, a computer application that is configured for remote resource management.

The computer application can be configured so as to enable configuration of the remote resource without human-machine interaction for the purpose of entering authentication information. According to one possibility, the computer application has no human-machine interaction for entering authentication information.

As the communication protocol, the present description refers, for example, to the SSH protocol, for Secure SHell.

As the client program implementing a client part of a communication protocol, the present description refers, for example, to the client program also known as SSH.

The connection method according to the first aspect of the present disclosure can comprise an initial step of interposing a facade command between the computer application and the client program, such as the SSHPASS command (https://sourceforge.net/p/sshpass), which is used only to allow the password to be entered on the command line, which the SSH client does not natively allow for security reasons.

The connection method according to the first aspect of the present disclosure comprises:

a step of executing the facade command when the client program is called by the computer application, the facade command being interposed between the computer application and the client program, a step of retrieval of the configuration parameters by the facade command, a step of reception by the facade command of authentication data for accessing of the computer resource through querying of a vault on the basis of the parameters retrieved, a step of establishing a connection between the facade command and the secure resource by executing the client program, into which the authentication data for accessing the computer resource, on the one hand, and parameters retrieved, on the other hand, are injected as input, a step of establishing a direct connection between the application and the secure computing resource.

In this description, a password vault is a software module that stores a number of passwords in a secure digital location. By encrypting password storage, the password vault provides users with the ability to use a single master password in order to access a number of different passwords that are used for different web sites or services.

The step of establishing a connection between the facade command and the secure computing resource can include modifying the configuration parameters received and injecting the modified configuration parameters into the client program. The retrieved configuration parameters can be modified, for example, in order to adapt to the type of connection data extracted from the vault. For example, when the computer application is Ansible, that application assumes the use of SSH keys, and the parameters received thus include parameters of the SSH command for the use of an SSH key. However, the authentication data may be of the password type, in which case it is necessary to modify the parameters before they are injected into the SSH command. The step of executing the facade command may include, subsequently at the end of the direct connection between the application and the secure computing resource, sending a notification of the end of use of the authentication data to the vault. Also, if the authentication data have been extracted from the vault with a request for exclusivity, the end-of-use notification for the authentication data terminates the exclusive use thereof, enabling them to be rotated as required.

To this end, the facade command may include a step of modification by the vault of the authentication data after receipt of the end-of-use notification.

In addition, the facade process may include a step of reception by the vault of a request for exclusivity of the authentication data prior to the step of receiving the authentication data or implicitly during the latter.

The step of querying the vault on the basis of the retrieved configuration parameters may include sending the vault authentication data for accessing the vault, the authentication data for accessing the vault being obtained through decryption using a transient cryptographic key for encrypted authentication data for accessing the vault, the encrypted authentication data for accessing the vault being stored in a permanent memory associated with the facade command.

The method may include a prior step of storing encrypted authentication data for accessing the vault in the permanent memory, the encrypted authentication data resulting from the encryption of authentication data of an account that is authorized to access the vault with a transitory cryptographic key, the transitory cryptographic key being determined by calculation through application of cryptographic processing to a plurality of information items that are time-invariant and representative of the computer execution environment of the application.

The method may include, subsequent to the step of receiving authentication data for accessing the secure computer resource, and prior to the step of establishing a connection between the facade command and the secure computer resource, the following steps:

calculation of a fingerprint of the call context of the client program as a function of invariant data representative of this context, comparison of the fingerprint calculated with a fingerprint stored in a permanent memory associated with the facade command, and, a) in the event of a difference, non-implementation of the step of establishing the connection between the facade command and the secure IT resource, b) in the event of compliance, implementation of the step of establishing the connection between the facade command and the secure IT resource.

The method may include a prior step of storing an encrypted fingerprint in the permanent memory, the encrypted fingerprint resulting from the encryption of the encryption of a fingerprint of the call context of the client program as a function of invariant data representative of this context, the transient cryptographic key being determined by calculation through application of cryptographic processing to a plurality of information items that are time-invariant and representative of the computer environment of execution of the application.

As will be readily understood, the encrypted authentication data as well as the encrypted fingerprint can be saved in the same file, also called a credential file.

According to one embodiment, a fingerprint of the call tree of the client program is determined.

According to one possibility, the facade command is executed within a facade process and the client program may be executed within a client program process, the client program process being a child process of the facade process. The client process can be created, for example, through calling of the primitive fork( ) by the facade process (pB).

When the invariant data includes a fingerprint of the call tree of the client program process, the facade command may include, prior to determining the fingerprint of the call tree, a waiting step that ends when the code of the client program process has a code that is identical to the code of the client program.

According to one variant, the fingerprint and the data extracted from the vault are stored in a local permanent memory in encrypted form in a local cache.

According to a particular embodiment, the fingerprint and the data extracted from the digital vault are protected by an obfuscation technique.

According to a first possibility, the obfuscation technique is static and consists of removing the frame pointer register or replacing program constants with recursive calculations.

According to another possibility, the obfuscation technique is dynamic and consists in blocking access in the event that a debugging operation is detected.

According to another aspect of the present disclosure, a computer program product is proposed that can be downloaded from a communication network and/or stored on a computer-readable medium and/or executed by a microprocessor, and loaded into an internal memory of a calculation unit comprising program code instructions, which, when executed by the calculation unit, implement the steps of a method according to the first aspect of the present disclosure or one or more of the improvements thereof.

BRIEF DESCRIPTION OF THE DRAWINGS

Other advantages and particularities of the present disclosure will become apparent on reading the detailed description of implementations and embodiments, which are in no way limiting, with reference to the accompanying drawings, in which:

FIG. 6 is pseudo-code of a waiting loop that is implemented by the access method according to the present disclosure.

DETAILED DESCRIPTION

Since the embodiments described hereinafter are not limiting in nature, it is possible, in particular, to consider variants of the present disclosure that comprise only a selection from the features that are described, provided that this selection of features is sufficient to confer a technical advantage or to differentiate the present disclosure from the prior art. This selection comprises at least one preferably functional feature without structural details, or with only a portion of the structural details if this portion alone is sufficient to confer a technical advantage or to differentiate the present disclosure from the prior art.

In the figures, an element appearing in a plurality of figures retains the same reference.

Context of the Prior Art

Figure 1:
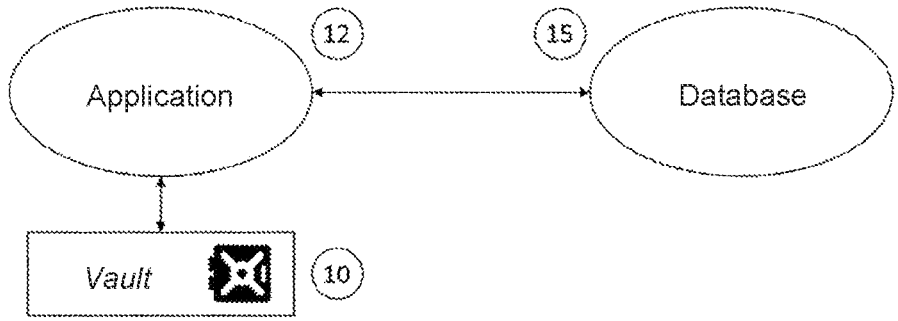
FIG. 1 is a functional schematic view of a method for accessing a secure IT resource by a computer application.
Figure 2:
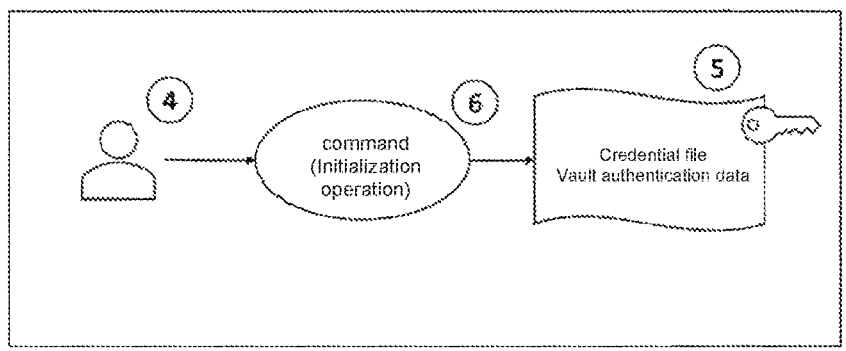
FIG. 2 is a functional schematic view of an initialization process of the method described in FIG. 1.

As illustrated by FIG. 1, the object of the method according to the prior art is to allow an application 12 to access a secure resource 15, such as a database, without any human-machine interaction.

To this end, it is proposed that the application be able to receive the authentication data for the secure resource 15 from a vault 10 stored on remote equipment, for example, a physical or virtual box.

Function Diagram

The method according to the prior art for accessing the secure computer resource 15 can be broken down into three parts:

an initialization process,
an access process during a first execution,
an access process for subsequent executions.

Initialization Process

Figure 3:
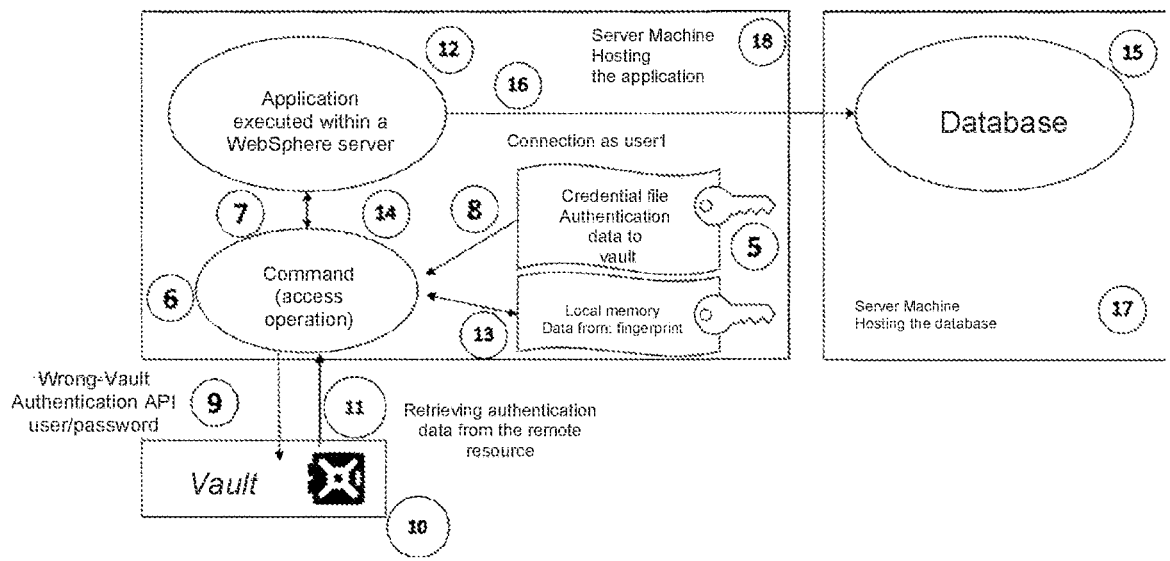
FIG. 3 is a functional schematic view of part of the method for accessing the computer resource described in FIG. 1.

This process, which is illustrated by FIG. 3, comprises the calculation of a transient cryptographic key through the execution of a computer code by the application 12, which is hosted on a server 18, for example, by a WebSphere application server (trade name).

An administrator 4 of the application 12 launches a command 6 on the server 18 corresponding to the execution of the method that is the object of the present disclosure.

This execution controls the initialization step.

This step consists in asking the user to enter the authentication data that is required in order to access the digital vault 10 in which are stored the authentication data on the secure resource 15 to which the application 12 is to gain access.

More generally, the digital vault 10 comprises a plurality of authentication data items for accessing a plurality of secure resources.

The command 6 retrieves the authentication data item(s) and the ciphers by applying a cryptographic algorithm.

To this end, the command triggers the calculation of a transient cryptographic key using parameters corresponding to invariant data characterizing the command execution environment. The transient cryptographic key is never stored in ROM. Invariant data can include:

the name and/or the identifier of the computer on which the command is being executed,
the name of the command,
a digest of the executable code of this command,
the identifier of the owner of the executable.

The authentication data is encrypted with the transient cryptographic key calculated in this manner and then stored, in encrypted form, on the server 18 in a credential file 5.

First Access to the Hosted Resource

FIG. 3 illustrates the process for the accessing of the hosted secure resource 15 by the application 12.

The launching 7 of the command 6 by the application 12 in first access mode brings about the execution of a retrieval step 8 in the credential file 5 of the encrypted authentication data (stored during the initialization process), thereby allowing access to the vault 10.

The command 6 then launches a step of decrypting the authentication data implementing the aforementioned cryptographic algorithm, which uses a transient cryptographic key that is calculated again from the aforementioned invariant data.

The command then launches a step 9 of accessing the digital vault 10 containing the authentication data 11 for the secure resource 15 in order to receive the authentication data 11.

Access step 9 can implement an authentication programming interface API to identify themselves to the vault 10 and receive the authentication data 11. Furthermore, the command 6 calculates the fingerprint of the application 12 that launched the command 6. The calculated fingerprint is stored in a local memory on the server 18 on which the application 12 is being executed. The calculation of the fingerprint can be performed before or after step 9 but always before step 13, which will now be described.

The command 6 then encrypts the authentication data 11 and the fingerprint calculated with the transient cryptographic key used for decryption of the credential file, and, during a step 13, stores the encrypted authentication data as well as the encrypted fingerprint in the local memory.

The last step 14 for the command 6 consists in providing the calling application 12 with the authentication data 11 in order to allow access 16 to the secure resource 15. Authentication data are provided in clear text to the application 12.

Subsequent Access to the Secure Resource

Subsequent accesses implement the same steps, with the exception of the step of determining the calculation of the fingerprint of the application 12 (and of the step of storing the calculated fingerprint).

Since the fingerprint of the application 12 has already been stored in encrypted form in the local memory 13 during the first access to the secure resource, the stored fingerprint is compared with a new calculation of the fingerprint of the calling application.

Also, it is necessary to decrypt the encrypted fingerprint that is stored in the local memory. For this purpose, a transient cryptographic key is again calculated from the aforementioned invariant data. The encrypted fingerprint is decrypted by implementing the abovementioned cryptographic algorithm with the transient cryptographic key. If the two fingerprints differ, processing is interrupted and an error message is sent.

Then, optionally, step 9 is repeated in order to receive, from the vault 10, new authentication data 11 as well as a new recording of the encryption, with the transient cryptographic key used implementing the aforementioned cryptographic algorithm of the new authentication data 11.

As an alternative to the option, the authentication data 11 are determined by decryption using the aforementioned cryptographic algorithm, which uses the calculated transient cryptographic key.

Finally, the process continues with step 14, which consists in providing the authentication data 11 to the application 12 in order to allow access 16 to the secure resource 15.

Unavailability of the Vault

In the event that access to the vault 10 is not possible, the encrypted authentication data stored during the first access or during a subsequent access to the secure resource are used after decryption by means of a decryption step using the aforementioned cryptographic algorithm, which uses a transient cryptographic key that is again calculated from the aforementioned invariant data.

Proposal for a Method for Accessing a Computer Resource

As has been shown, the method according to the prior art allows an application to implement a method, implemented in the form of a command, for retrieving authentication data in a vault for the purpose of accessing a secure resource.

Figure 4:
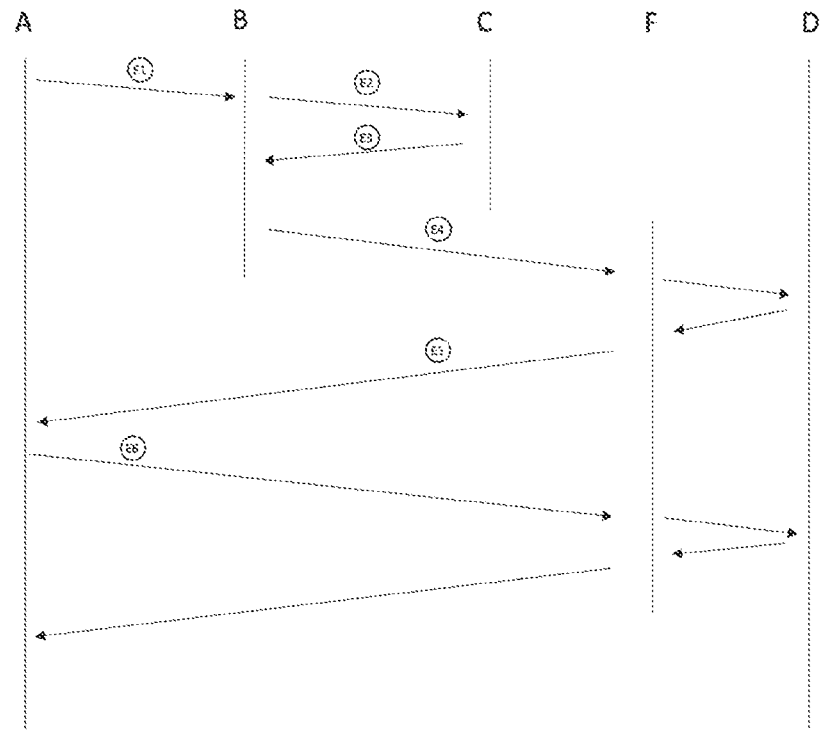
FIG. 4 is a schematic view of a sequence of processing operations in an access method according to the present disclosure.

With reference to FIG. 4, it is the object of the present disclosure to provide additional security for access of a computer application A, for example, Ansible, to a secure resource D, by not providing the authentication data to the application.

To this end, it is proposed that the application utilize a method that is implemented in the form of command B, thereby creating a connection to the shared resource.

In the case of the complete automation of the computer application A, the latter has no human-machine interaction for entering authentication information.

With reference to FIG. 4, the application A is initially configured to establish a connection to the secure resource D by means of a client program F implementing a client part, for example, an SSH client, and a communication protocol, such as the SSH protocol, the client program using authentication data.

As will be readily understood, the authentication data can be passwords or private keys.

Initial Stage of Interposition of a Facade Process

According to the present disclosure, the method comprises an initial step E1 of interposing a facade command B according to the present disclosure between the computer application A and the client program F.

In the present description, a facade command is a command that exposes an interface similar to that of the client program F (here SSH) normally used by the computer application A in order to intervene naturally between the computer application A and the client program F.

Several technical solutions can be envisaged for this purpose.

For example, it is possible, if applicable, to edit a configuration file of the computer application A so as to indicate a path for calling the facade command B instead of a path for calling the client program F.

Another solution may involve modifying the computing environment variable, referred to as PATFI.

Next Steps in Accessing IT Resources

The following steps for accessing the IT resource include:
a step E1 for invoking the execution of the facade command B by the application A, the application A executing the facade command while believing that it is calling the client program F whose facade is emulated by the facade command,
a step E2 comprising:
a step of receiving parameters passed from the application A to the client program F,
a step of receiving encrypted authentication data, by the facade command, from a vault C,
a step E3 comprising:
a step of establishing a direct connection between the application A and the secure resource D by means of the client program F by injecting into the client program F the authentication data received as well as the parameters retrieved and modified if necessary, for example, in order to adapt to the type of connection data extracted from vault C,
at the end of the connection, if the connection data have been extracted from the vault with a request for exclusivity, the facade command B can inform the vault C, by means of its API, that the connection data is no longer being used, thereby putting an end to the exclusive use thereof and enabling them to be rotated as required.

Figure 5:
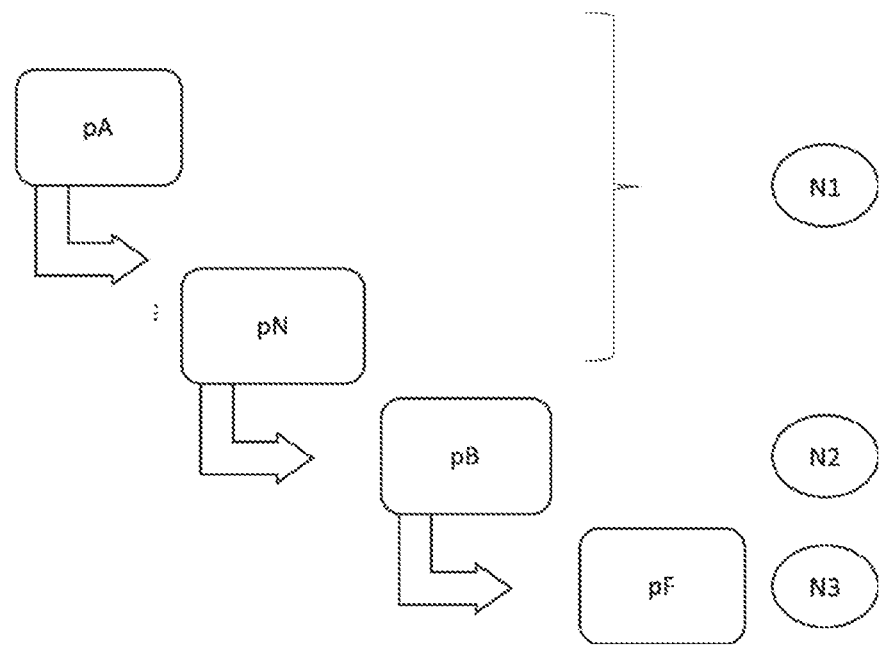
FIG. 5 is a schematic view of a diagram of a call tree of the access method according to the present disclosure.

FIG. 5 shows a call tree of a facade process pB that is associated with the facade command B according to the present disclosure.

A process pA associated with the computer application A can include one or more child processes, for example, a child process pN. These processes form a first level N1.

The child process pN comprises the call of a facade process pB that is associated with the facade B command. This process forms a second level N2.

The facade process pB includes the creation of a client program process pF that is associated with the client program F, as previously described. This process forms a third level N3.

It is proposed that a fingerprint of the call tree of the client program be included among the invariant data characterizing the command execution environment.

Waiting for the Client Program Process to Complete Startup

Like Linux, Unix-type systems use a special sequence to initiate a sub-process.

The parent process begins by duplicating itself by an operation initiated using a primitive called fork.

When a child process is created by the primitive fork, the child process inherits code from the parent process.

Also, the sub-process, called the child process, must make a call to a primitive in order to replace the code that it has inherited from the parent process with that of the desired command. Several primitives can be called, such as the primitives execl, execv, execle, execve, execlp, and execvp.

Until the code replacement function is complete, the child subprocess is regarded as executing the code of the parent process.

Also, the use of a fingerprint of the calling application that might include invariant data comprising the call tree prior to a decryption of the encrypted authentication data implementing the call tree is not feasible because the correct code would not be taken into account.

Also, it is proposed, as represented by the pseudo-code of FIG. 6, that the fingerprint of the calling application containing invariant data such as the call tree be determined only after the termination of the process for starting the command called in step E4 for establishing a connection between the facade process and the secure resource by means of the client program F has been awaited.

More precisely, while the completion of the command start process is being awaited, the code of the client command process pF is expected to match the code of the client command F.

As will be readily understood, the present disclosure is not limited to the examples that have just been described, and numerous modifications can be made to these examples without departing from the scope of the present disclosure. In addition, the various features, forms, variants, and embodiments of the present disclosure can be grouped together in various combinations as long as they are not incompatible or mutually exclusive.

The invention claimed is:

1. A method for connecting a computer application to a secure computer resource by means of a facade command, wherein the computer application is configured to configure the secure computer resource without human-machine interaction, wherein the computer application is initially configured to establish a connection to the secure computer resource by means of a client program and configuration parameters, and wherein the client program implements a client part of a communication protocol and is configured to receive authentication data as input, the method comprising the following steps:
   a step of executing the facade command during a call of the client program by the computer application, the facade command being interposed between the computer application and the client program;
   a step of retrieval, by the facade command, of the configuration parameters;
   a step of reception by the facade command of authentication data for accessing the secure computer resource through querying of a vault, on a basis of the retrieved configuration parameters;
   a step for establishing a connection between the facade command and the secure computer resource by executing the client program, into which the authentication data for accessing the computer resource and the retrieved configuration parameters are injected as input; and
   a step of establishing a direct connection between the computer application and the secure computer resource.

2. The method of claim 1, further comprising an initial step of interposing a facade command between the computer application and the client program.

3. The method of claim 2, wherein the configuration parameters received are modified and then injected into the client program.

4. The method of claim 3, further comprising a step subsequent to the termination of the direct connection between the computer application and the secure computer resource in which a notification of use of the data authentication is sent by the facade command to the vault.

5. The method of claim 4, further comprising a step of modification by the vault of the authentication data after receipt of the notification of use.

6. The method of claim 5, further comprising a step of reception by the vault of a request for exclusivity of the authentication data prior to the step for retrieving encrypted authentication data.

7. The method of claim 6, wherein the step of querying the vault on the basis of the retrieved configuration parameters comprises sending authentication data for accessing the vault to the vault, the authentication data for accessing the vault being obtained through decryption using a transient cryptographic key for encrypted authentication data for accessing the vault, the data of encrypted authentications for accessing the vault being stored in a permanent memory associated with the facade command.

8. The method of claim 7, further comprising, subsequent to the step of receiving authentication data for accessing the secure computer resource, and prior to the step of establishing a connection between the facade command and the secure IT resource, the following steps:
   calculation of a fingerprint of a call context of the client program as a function of invariant data representative of this context; and
   comparison of the fingerprint calculated with a fingerprint stored in a permanent memory associated with the facade command; and
   i) in the event of a difference, non-implementation of the step of establishing the connection between the facade command and the secure IT resource; and
   ii) in the event of compliance, implementation of the step of establishing the connection between the facade command and the secure IT resource.

9. The method of claim 1, wherein the configuration parameters received are modified and then injected into the client program.

10. The method of claim 1, further comprising a step subsequent to the termination of the direct connection between the computer application and the secure computer resource in which a notification of use of the data authentication is sent by the facade command to the vault.

11. The method of claim 10, further comprising a step of modification by the vault of the authentication data after receipt of the notification of use.

12. The method of claim 11, further comprising a step of reception by the vault of a request for exclusivity of the authentication data prior to the step for retrieving encrypted authentication data.

13. The method of claim 1, wherein the step of querying the vault on the basis of the retrieved configuration parameters comprises sending authentication data for accessing the vault to the vault, the authentication data for accessing the vault being obtained through decryption using a transient cryptographic key for encrypted authentication data for accessing the vault, the data of encrypted authentications for accessing the vault being stored in a permanent memory associated with the facade command.

14. The method of claim 13, further comprising a prior step of storing encrypted authentication data for accessing the vault in the permanent memory, the encrypted authentication data resulting from the encryption of data from authentication of an account that is authorized to access the vault with a transient cryptographic key, the transient cryptographic key being determined by calculation through application of cryptographic processing to a plurality of information items that are time-invariant and representative of a computer environment for executing the application.

15. The method of claim 13, wherein a fingerprint of a call tree of the client program is determined.

16. The method of claim 15, wherein the facade command is executed within a facade process and the client program is executed within a client program process, the client program process being a child process of the facade process, the facade command further comprising, prior to the step of determining the fingerprint of the call tree, a waiting step that ends when a code of the client program process has a code that is identical to the code of the client program.

17. The method of claim 1, further comprising, subsequent to the step of receiving authentication data for accessing the secure computer resource, and prior to the step of establishing a connection between the facade command and the secure IT resource, the following steps:
   calculation of a fingerprint of a call context of the client program as a function of invariant data representative of this context; and
   comparison of the fingerprint calculated with a fingerprint stored in a permanent memory associated with the facade command; and
   i) in the event of a difference, non-implementation of the step of establishing the connection between the facade command and the secure IT resource; and
   ii) in the event of compliance, implementation of the step of establishing the connection between the facade command and the secure IT resource.

18. The method of claim 17, further comprising a prior step of storing an encrypted fingerprint in the permanent memory, the encrypted fingerprint resulting from the encryption of the encryption of a fingerprint of the call context of the client program according to invariant data representative of this context, a transient cryptographic key being determined by calculation through application of cryptographic processing to a plurality of information items that are time-invariant and representative of the computer environment for executing the application.

19. The method of claim 18, wherein a fingerprint of a call tree of the client program is determined.

20. A non-transitory computer-readable storage medium storing instructions thereon that, when executed by at least one processor, cause the at least one processor to implement the steps of a connection method according to claim 1.

* * * * *